Oct. 18, 1966 D. S. STACEY 3,279,258
ENVIRONMENTAL MEASURING INSTRUMENTATION
Filed Nov. 20, 1964 7 Sheets-Sheet 1
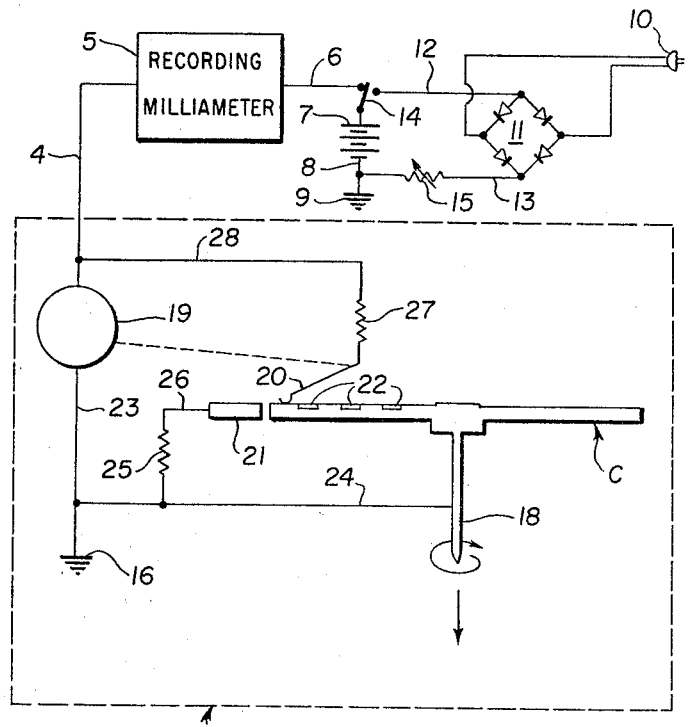
Fig_1
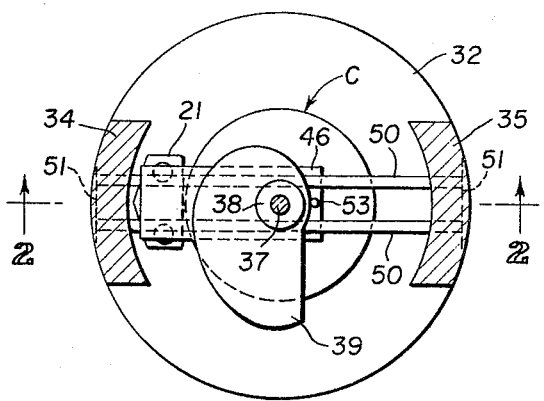
Fig_3
INVENTOR.
DAVID S. STACEY
BY
*Robert E. Harris*
ATTORNEY

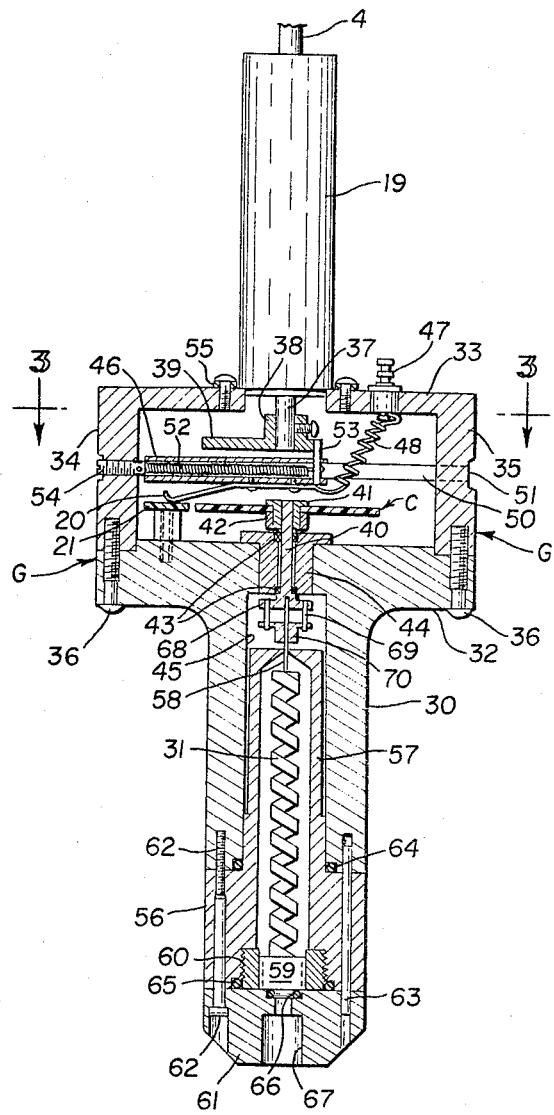
Fig_2

Oct. 18, 1966 D. S. STACEY 3,279,258
ENVIRONMENTAL MEASURING INSTRUMENTATION
Filed Nov. 20, 1964 7 Sheets-Sheet 3

INVENTOR.
DAVID S. STACEY
BY
Robert E. Harris
ATTORNEY

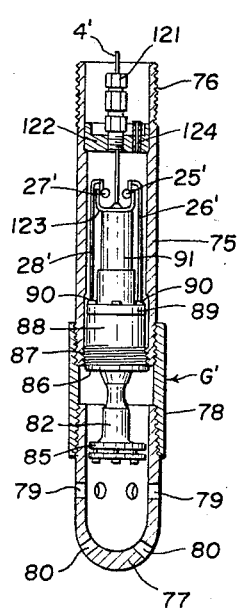
Fig_6
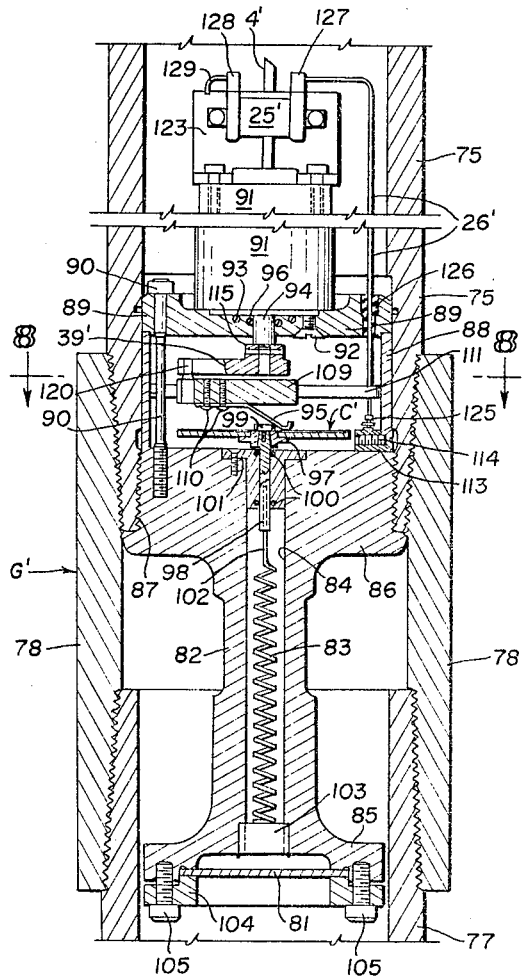
Fig_7
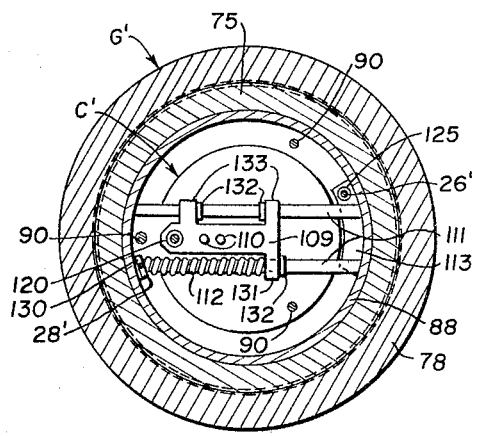
Fig_8
INVENTOR.
DAVID S. STACEY
BY
ATTORNEY

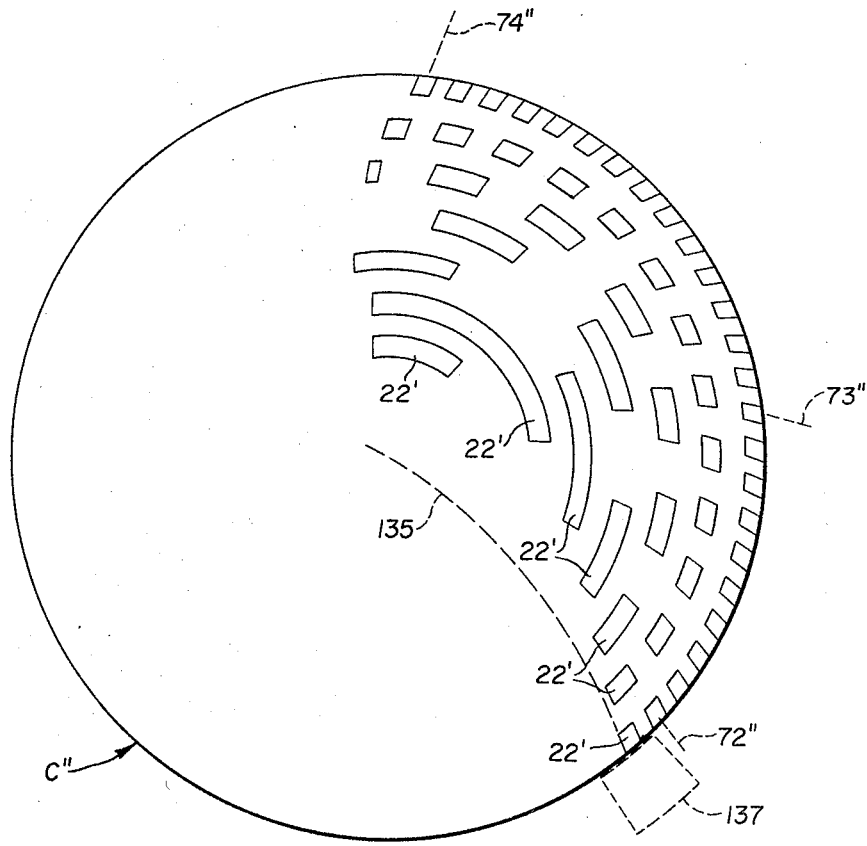

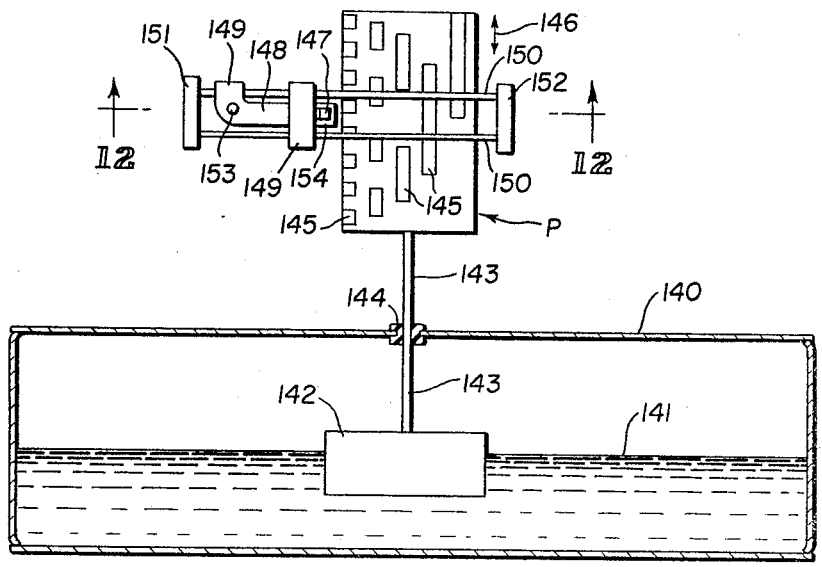
Fig_11
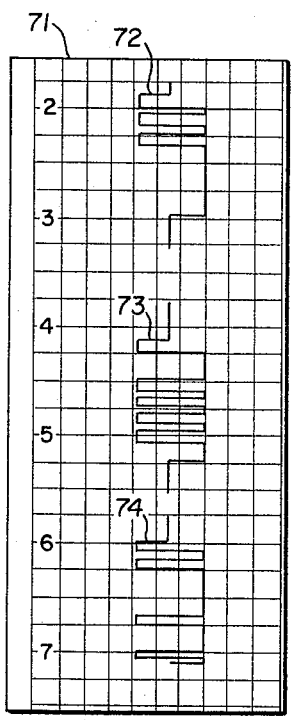
Fig_10
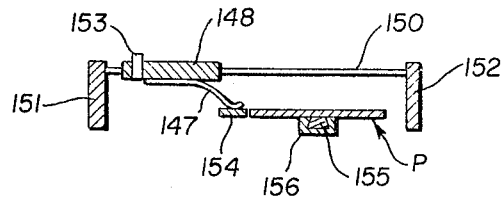
Fig_12

Oct. 18, 1966 D. S. STACEY 3,279,258
ENVIRONMENTAL MEASURING INSTRUMENTATION
Filed Nov. 20, 1964 7 Sheets-Sheet 7
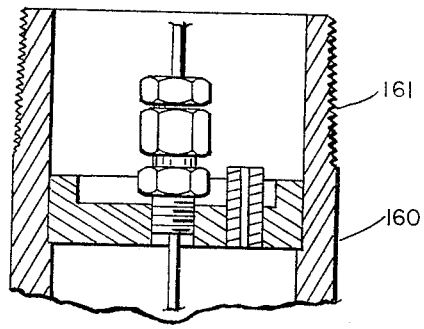
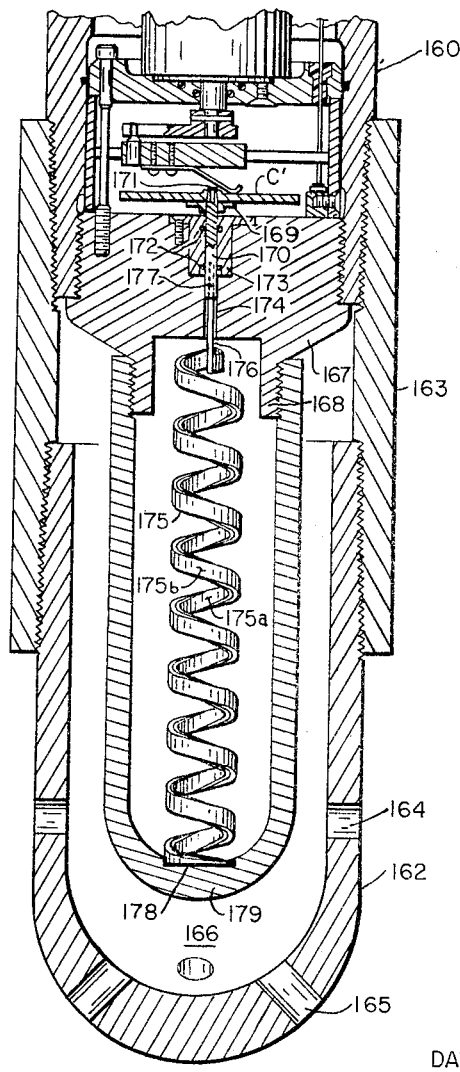
FIG.13.
INVENTOR.
DAVID S. STACEY
BY
ATTORNEY

United States Patent Office 3,279,258
Patented Oct. 18, 1966

3,279,258
ENVIRONMENTAL MEASURING INSTRUMENTATION
David S. Stacey, Boulder, Colo., assignor to Ball Brothers Research Corporation, Boulder, Colo., a corporation of Colorado
Filed Nov. 20, 1964, Ser. No. 420,478
25 Claims. (Cl. 73—398)

This application is a continuation-in-part of our copending application entitled "Environmental Measuring Instrumentation," Serial Number 123,411, filed July 10, 1961, by David S. Stacey, now abandoned.

The present invention relates generally to environmental measuring instrumentation, and more particularly to measuring instruments capable of generating and measuring current pulses indicative of environmental conditions at a remote point.

In general, such instrumentation may be used to measure a wide variety of environmental conditions, such as pressure, temperature, humidity, velocity and others. In measuring various environmental conditions, it is often necessary to use a sensing means located at a point remote from the indicator, recorder or the like, which produces an indication or record of changes in the respective environmental condition. The gage or other sensing means or device which is responsive to changes in such environmental condition is normally most conveniently connected with the indicator through an electrical circuit. However, the length of the electrical conductor, such as a wire, will differ from one installation to another, or from time to time, causing the electrical resistance between the sensing means and the indicator to affect the transmission of current and hence introduce a factor into the reading for which compensation must be made. Also, the conductor may be subjected to temperature fluctuations, which in turn affect the resistance of the conductor and result in the indicator or recorder receiving current pulses which do not accurately reflect the conditions present at the sensing means. Even when the gage or sensing means and the recorder are relatively close to one another, i.e. on the order of inches or a few feet, if precise measurements are required, the length of the conductor and the temperature will still adversely affect the readings obtained. Thus, an indicator which depends upon slight differences in resistance, produced by a movable element responsive to an environmental change, such as pressure, is not sufficiently accurate for practical purposes and also must be calibrated for each installation, since the calibration at one time may not be accurate at a much later time.

The present invention is particularly adapted for use in measuring conditions at the bottom of any desired depth in an oil well or the like, such as the pressure and temperature. The gage or sensing means must, of course, be positioned at the bottom or at the desired depth in an oil well. When the gage is lowered to or placed at different depths in an oil well, the length of the electrical wires or wire differs considerably, thus causing the electrical resistance between the gage and the indicator to differ in a corresponding manner. Also conditions in different wells or at different times in the same well may change the resistance of the wires, such as changes in temperature, changes in current leakage and others. This unduly affects the accuracy of the readings obtained. Thus, a gage which depends upon slight differences in resistance, produced by a movable element responsive to pressure, has not been sufficiently accurate for practical purposes and also must be calibrated for each well in which used, since the calibration at one time may not be accurate at a much later time. Also, if one wire only need be used and a ground path, as through casing, can be used for the return, a considerable saving in wire is effected. This is a very significant advantage in that the cost of the wire conductor in a well having a considerable depth, for instance 10,000 feet, may be many times as great as the cost of the measuring instrument itself. However, the resistance of the ground path will vary from well to well and also at different times in the same well. As will be evident, when readings are taken in different wells, or at different times in the same well, extreme accuracy is necessary for the information to be of greatest value.

Among the objects of this invention are to provide improvements in environmental measuring instrumentation; to provide such instrumentation adapted to indicate one or more environmental conditions at a remote point; to provide such instrumentation which includes a sensing device for sensing changes in an environmental condition at one point and an indicating or recording device at another point, connected electrically but producing indications which are independent of variations in resistance or other changes in the electrical conductor; to provide such instrumentation which includes a member movable by a sensing device and means for moving an electrically conductive element across said member; to provide such instrumentation which, in one or more embodiments, comprises a digital pressure gage which is particularly useful in measuring the bottom hole pressure or temperature in an oil well or the like; to provide such a gage which requires only one insulated conductor and utilizes a ground path to an indicating or recording device at a remote point; to provide such a gage which will produce readings at a remote point which are independent of the resistance of the conductor or ground path; to provide such a gage which is particularly adapted to include a code disc rotated by a Bourdon tube in response to pressure changes and a brush for scanning the code disc; to provide such a pressure gage which will produce a clear indication when a scan has been completed; to provide such instrumentation which is particularly adapted to indicate temperature and temperature changes in response to a temperature sensing means; to provide such instrumentation which, in a further embodiment, is particularly adapted to indicate fluid level at a remote point; to provide such instrumentation which includes a code plate mounted for linear motion in response to changes in liquid level and a brush for scanning the code plate; and to provide instrumentation for measuring changes in environmental conditions which, in each form, is rugged in construction, yet simple and efficient in operation.

Additional objects and the novel features of this invention will become apparent from the description which follows, taken in conjunction with the accompanying drawings, in which:

FIGURE 1 is a schematic diagram of instrumentation comprising a digital pressure gage of this invention, showing particularly an electrical circuit which may be used therein to obtain indications of the pressure at a remote point;

FIGURE 2 is a longitudinal section of the principal parts of the digital pressure gage shown in FIGURE 1;

FIGURE 3 is a cross section, taken along line 3—3 of FIGURE 2, showing particularly a cam which moves a scanning brush across a code disc;

FIGURE 6 is a side elevation, on a reduced scale and with an outer housing in vertical section, of a digital pressure gage of this invention which forms another embodiment thereof;

FIGURE 7 is a condensed longitudinal section, on an enlarged scale, of the pressure gage of FIGURE 6;

FIGURE 8 is a cross section taken along line 8—8 of FIGURE 7;

FIGURE 9 is a top plan view of an alternative code disc, which may be used with the gage of FIGURE 2 when a brush is mounted for angular motion;

FIGURE 10 is a representation of the type of pattern produced on a chart at three different positions of the code disc of FIGURE 5 of FIGURE 9;

FIGURE 11 is a diagrammatic vertical section of instrumentation forming another embodiment of this invention and utilized for measuring change in liquid level within a container or tank;

FIGURE 12 is a fragmentary section taken along line 12—12 of FIGURE 11; and

FIGURE 13 is a condensed longitudinal section of a digital temperature gage of this invention which forms another embodiment thereof.

Figure 5:
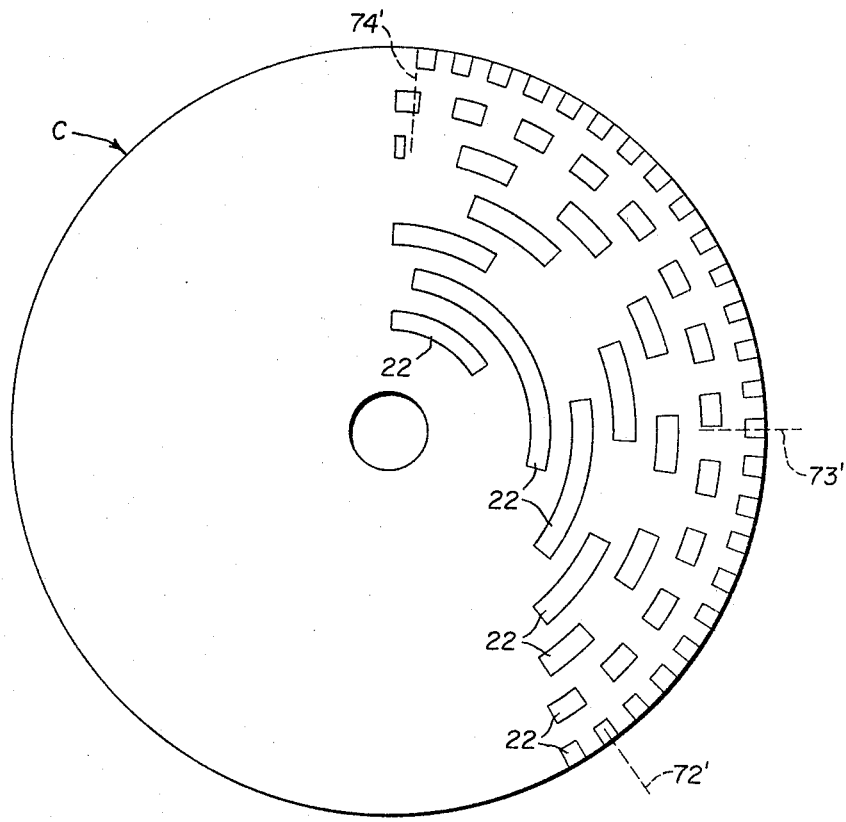
FIGURE 5 is an enlarged, top plan view of the code disc of the gage of FIGURE 2.

In accordance with the present invention, apparatus is provided for measuring environmental conditions which includes a movable member forming part of or associated with a sensing device which moves the movable member in accordance with changes in environmental conditions, such as pressure, temperature, liquid movement or displacement, humidity, velocity, and others. A code member is operatively connected to the movable member and is movable therewith, whereby displacement of the movable member from a predetermined position causes displacement of the code member from a corresponding position. Advantageously, the code member is provided with a pattern of electrically conductive and nonconductive portions, which pattern is indicative of the position of the code member relative to its original position. Associated with the code member is means for contacting the conductive and nonconductive portions of the code member, to produce current pulses in response to, and indicative of, the movement of the code member from its initial position, thus indicating corresponding movement of the movable member in response to the sensing means. The invention also contemplates means for measuring or indicating the magnitude of these current pulses, as determined by movement of the code member, such measurement being unaffected by the distance from the measuring instrument to the code member.

Generally, the measurement of the displacement of the movable member is not limited to displacement in a given direction. For example, rotational, lateral, angular or axial displacement or any other movement of the movable member may be measured. Thus, it is only necessary to operatively connect the movable member, such as a shaft, rod, arm or the like, to the sensing means, such as a diaphragm, spring, bimetallic element, Bourdon tube or the like, which is capable of transferring the effect of a change in environmental conditions to a physical movement, which is in turn applied to the code member. For example, if a bimetallic element is connected to a force transmitting member, such as a shaft, fluctuations in temperature in the area of the bimetallic element cause corresponding movements of the shaft. Similarly, a diaphragm, which is responsive to changing pressure conditions, causes corresponding movement of a rod, arm or the like, connected thereto. In the case of a Bourdon tube wound in spiral form, a rotational force due to fluctuations in pressure is produced thus imparting a rotational movement to the movable member, such as a shaft or the like. The general operation of embodiments of this invention will first be described in connection with a digital pressure gage for use in measuring bottom hole pressure of oil wells, wherein the movable member and code member are rotated.

Thus, a digital pressure gage G constructed in accordance with this invention, as shown in FIGURE 2, may be mounted at the lower end of a pump casing or may be suspended in an oil well or the like by a single, insulated conductor 4 of FIGURE 1, which is connected at a remote point, as at the top of the well, with a recording milliammeter 5, the latter in turn being connected by a wire 6 with a suitable source of current, such as a battery 7, which is connected by a wire 8 to ground 9. The battery 7 is conveniently a 28-volt storage battery and may be charged from a source of alternating current, such as through a plug 10 adapted to be plugged into a conventional 110-volt socket and in turn connected across a full wave rectifier 11 for converting alternating to direct current. The output of rectifier 11 is connected across battery 7 by means of wires 12 and 13, the latter being connected to wire 8, leading from battery 7 to ground 9, and the former being connected to one terminal of a switch 14, by which the rectifier and milliammeter are selectively connected in circuit with the battery. Conveniently, a variable resistor 15 is connected in series with the rectifier and battery, in wire 13, for controlling the current and voltage applied to the battery when charging. Thus, when the pressure gage is to be used, switch 14 is thrown to the position shown, so that battery 7 is connected to wire 6 for driving the recording milliammeter as well as driving a motor of the pressure gage below. However, when the pressure gage is not in operation, switch 14 may be thrown to the terminal of wire 12 so that battery 7 may be recharged.

The parts enclosed within the dash line rectangle G of FIGURE 1 are within gage G of FIGURE 2 and are associated more specifically in a manner described later. The return path of current is between a ground 16, produced by attachment or connection of the gage G to the pump casing in the well, or by contact or connection between the gage G and a casing within the well. As will be evident, the length of conductor 4 will vary for different well depths, while the resistance thereof may differ for different conditions in the same well or different wells of the same depth, e.g. due to temperature changes which change the resistance of the conductor, current leakage or the like. Also, the ground contact may vary for different wells or at different times in the same well. Thus, it is extremely important that the readings obtained from the recording milliammeter 5 be independent of the resistance of conductor 4, as well as independent of the voltage of battery 7 and the ground path.

In general, the gage G includes a code disc C, mounted on a shaft 18 which is rotated by a Bourdon tube in response to pressure changes, and a motor 19 operatively connected to a brush 20, for moving the brush from a rest or extension plate 21 across the code disc and back to rest 21. Such movement is normally required only once, so that motor 19 may be of a conventional type which will turn only one revolution when energized, although other types of motors may be used and the movement of brush 20 across code disc C repeated several times, if desired. The code disc C has electrically conductive portions and nonconductive segments, such as a plurality of nonconducting segments 22 interspersed with conducting portions. Thus, disc C may be formed of fiber glass cloth impregnated with an epoxy resin and then cured, then provided with a conductive layer, as of copper, except at the positions of the nonconducting segments 22, which are conveniently arranged in a pattern described later and the thickness of which is exaggerated in FIGURE 1 for clarity of illustration. As brush 20 scans code disc C, it moves radially across the conducting portions of the code disc and also certain of the nonconducting segments 22, depending upon the position of the disc. The number and the position of the nonconducting segments which the brush will contact, during one sweep or scan across the code disc, will depend upon the angular rotation of the disc by a pressure responsive device, such as a Bourdon tube, and the readings of the milliammeter 5 will indicate the angular position of the code disc, which in turn will indicate the pressure being measured.

In accordance with this invention, motor 19 is connected to ground 16 by a wire 23, to which a ground wire 24, leading from shaft 18, is also connected; rest 21 is connected to a resistance 25 by a wire 26, with resistance 25 being connected to ground wire 24; and brush 20 is connected to a resistance 27, in turn connected to conductor 4, as by wire 28. As will be evident, brush 20 coacts with the conductive and non-conductive engageable segments to form a signal gate so that there will be three conditions when different resistances are imposed in the circuit, due to the position of brush 20, and corresponding differences in the current indicated at milliammeter 5. The first condition is when brush 20 is on rest stop or extension plate 21, the current indicated by milliammeter 5 then being that drawn by motor 19, connected in parallel with resistances 25 and 27, in series. The second is when brush 20 is on a conducting portion of code disc C, as in the position shown in FIGURE 1, the current indicated by milliammeter 5 then being the current drawn by motor 19 with resistance 27 only connected in parallel. The third is when brush 20 engages a nonconducting segment 22, the current indicated by milliammeter 5 then being only the current drawn by motor 19. As will be evident, the current values recorded by the milliammeter are relative values, indicative of the three conditions above, and the values of resistances 25 and 27 can be selected so that the three different values are readily distinguishable. Since the indications obtained are compared to determine the position of the code disc C and the corresponding pressure, any change in resistance of conductor 4 due to a difference in length thereof, depending on the depth of the pressure gage in a well bore or different conditions in the well bore, such as change in temperature, will not affect the relative values recorded by the milliammeter, because the current indications are based upon the fixed quantities of the internal resistance of motor 19, resistance 25 and resistance 27, which are not affected by the resistance of conductor 4, or of the casing or ground contact, or current leakage. Milliammeter 5 may, of course, be adjusted so as to record in a readily distinguishable manner the differences in current due to these three conditions, i.e. to amplify, as it were, the differences over the lowest current reading, which would be when brush 20 contacts a nonconducting segment. An intermediate current reading will, of course, be produced when brush 20 is on rest 21, while the highest current reading will be produced when brush 20 is on a conducting portion of the code disc. While the values of resistances 25 and 27 may be different, if desired they may conveniently be the same, since then the current indicated when brush 20 is on a conducting portion of the code disc will be greater than the current indicated when brush 20 is on rest 21 and the current indicated when brush 20 is on a nonconducting segment will be lowered than the "rest" current by the same amount.

As in FIGURE 2, one embodiment of a gage G of this invention includes a lower housing 30, in which a Bourdon tube 31 is installed and having an upper flange 32. Motor 19 is mounted on a bracket 33 having arcuate legs 34 and 35, as in FIGURE 2, and attached to the upper end of housing 30, as by cap screws 36 extending through holes in flange 32, as in FIGURE 2. Motor shaft 37 extends through a mounting hole in bracket 32 for attachment to a hub 38 of a cam 39, as by a set screw, as shown. Code disc C is mounted on the upper end of shaft 40, as by a flanged bushing 41 and a ring 42, while shaft 40 is rotatably mounted in a pair of spaced bearings 43 mounted in a flanged bushing 44 extending downwardly to the upper end of a central hole 45 in housing 30. Bearings 43 form a ground connection for code disc C, while the lower end of shaft 40 is conveniently connected to helical Bourdon tube 31 in a manner described later.

Figure 4:
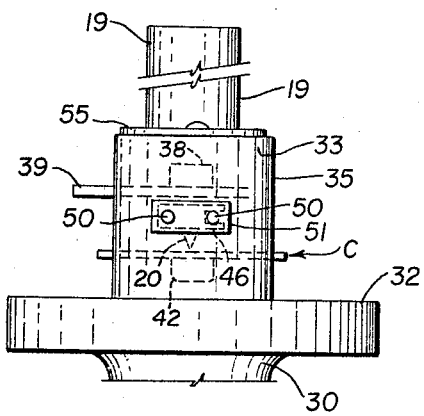
FIGURE 4 is a condensed, fragmentary side elevation of the upper portion of the gage and looking from the right in FIGURE 2, showing particularly details of the mounting means for the scanning brush.

Brush 20 is formed of resilient metal and is attached to the underside of a carriage or slide 46, as by rivets or screws, as shown, the forward end of brush 20 being bent upwardly to form a rounded surface to slide across code disc C and on and off extension plate 21. The opposite end of brush 20 is connected to one end of resistance 27, which is not shown in FIGURE 4, but which may be mounted in an outer housing which encloses the gage, such as on a bracket carried by motor 19, as in the embodiment of FIGURES 6–8, to be described. Thus, a wire may lead from resistance 27 to a binding post 47, mounted on bracket 33 and connected to brush 20 by a coiled wire 48, which accommodates movement of the slide and brush. Slide 46 is supported for movement across bracket 33 by a pair of spaced, parallel rods 50, as in FIGURES 2 and 3, which extend between and through legs 34 and 35 of the bracket and to a flat recess 51 in the outside of each bracket leg, which facilitates drilling the holes for rods 50. As in FIGURE 4, rods 50 also extend through holes or slots in slide 46, or a hole at one side and a slot at the other, to facilitate assembly. Rods 50 may be held by a press fit in the holes in the bracket legs, or the rods may be provided with a head at one end and a nut threadably received at the other end, to hold them in place. Slide 46 is adapted to move back and forth along rods 50 but is normally urged to the left, as viewed in FIGURES 2 and 3, by a tension spring 52, one end of which is secured to a pin 53 extending upwardly at the inner end of slide 46 and the other end of which is connected to a tension adjustment screw 54, which is threaded through bracket leg 34 and may be used to adjust the tension of the spring.

When motor shaft 37 and cam 39 rotate in a clockwise direction, as in FIGURE 3, pin 53 will be engaged by the peripheral surface of the cam and moved to the right, thus moving slide 46 and the associated brush 20 (shown in FIGURE 2) to the right until the cam has turned through an arc of 270°, whereupon pin 53 passes over the end of the cam and the pin and slide are pulled back to initial position by spring 52, which quickly pulls the carriage toward the left, until brush 20 again rests upon extension plate or rest 21. Thus, rotation of motor 19 will cause brush 20 to reciprocate radially back and forth across code disc C, although usually only one complete movement is required, since the variations in current are readily picked up by the milliammeter and/or recording milliammeter. Motor 19, which has a lower peripheral flange 55 secured to the top of bracket 33 by screws, as shown, is operated periodically only, i.e. when readings are to be taken by throwing switch 14 to place battery 7 in the circuit. At other times, the battery is being charged through rectifier 11 or is disconnected.

Bourdon tube 31 is helical and mounted in a tube housing 56 having an annular bore and an elongated extension 57 which is closed at the inner end, as shown, except for an axial hole through which extends a pin 58, connected to the Bourdon tube and adapted to turn the code disc C upon turning of the Bourdon tube due to pressure changes. A ring base 59 of Bourdon tube 31 is secured against rotation in a bushing 60, as by a series of lands and grooves or cooperating flutes, which permit the Bourdon tube to be adjusted radially for calibration, while bushing 60 is conveniently threaded into the lower end of tube housing 56. The latter is conveniently held in position by a cap 61, secured against rotation and clamped by a series of cap screws 62 and dowel pins 63, extending through appropriate holes in cap 61 and tube housing 56, then into tapped and untapped holes, respectively, in housing 30. Dowel pins 63 preferably have a sufficiently tight fit so as not to become loosened readily while the space around Bourdon tube 31 is preferably sealed in a suitable manner, as by an O-ring 64 in a groove at the lower inner edge of the bore of housing 30, an O-ring 65 in a groove at the lower inner edge of the bore of tube housing 56, and an O-ring 66 in a groove at the upper inner edge of a hole 67 in cap 61. Hole 67, which is conveniently counterbored, permits the pressure to be indicated, as at the bottom of an oil well, to be exerted against the lower end of Bourdon tube 31.

To connect Bourdon tube 31 with code disc C, the lower end of code disc shaft 40 is provided with flange 68 forming an upper coupling half and having a central hole, which receives the upper end of Bourdon tube pin 58, and radially spaced holes which receive the upper ends of a series of coupling pins 69, the lower ends of which are received in corresponding, radially spaced holes in a flange of a lower coupling half 70. The latter is conveniently provided with a hub, as shown, and a central hole through which Bourdon tube pin 58 extends to turn the coupling as the Bourdon tube turns and consequently also turn the code disc C. Bourdon tube pin 58, except at the upper end, is conveniently noncircular, such as square or hexagonal in cross section, while the central hole in coupling half 70 has a similar configuration, so that turning of Bourdon tube 31 will be transmitted to code disc C. The coupling formed by flange 68, pins 69 and coupling half 70 stabilizes pin 58 and also permits a noncircular hole to be broached through coupling half 70, rather than attempting to drill the same in the lower end of the code disc shaft 40.

As stated above, the code disc C has an electrically conductive surface, but is provided with a plurality of nonconducting segments 22, which may be arranged in the manner shown in FIGURE 5. These segments are conveniently arranged in seven concentric rows, to provide a so-called "gray" code. Thus, the position of the first segment and the extent of each segment in the respective rows may be provided in accordance with the following table, in which the first row is the outermost row and the seventh row is the innermost row:

| Row | Edge of First Segment, ° | Arc of Each Segment, ° |
| --- | --- | --- |
| 1st | 0 | 3 |
| 2d | 1½ | 6 |
| 3d | 4½ | 12 |
| 4th | 10½ | 24 |
| 5th | 22½ | 48 |
| 6th | 46½ | 96 |
| 7th | 94½ to | 150 |

As will be evident, a radial scan across the disc by the brush will produce a seven digit code number, made up of a combination of "zeros" and "ones," the "zeros" being indicative of a nonconductive segment and the "ones" of a conducting segment, or vice versa, as desired. The layout shown will provide 100 discrete "Gray" numbers having equivalent decimal values from 0 to 100. Thus, the indicators recorded by milliammeters 5 will at all times indicate the position of the disc and hence the pressure being exerted against Bourdon tube 31, which causes rotation of the disc. Also, with the arrangement shown, it is necessary for the disc to be turned through an angle of 150° only.

As indicated previously, each time brush 20 engages extension plate 21, the indication of the milliammeter will correspond to resistance of motor 19, in parallel with resistance 25 and resistance 27, which will be intermediate the current drawn when brush 20 engages a conducting and nonconducting segment, respectively, of code disc C. Also, when the brush engages a conducting segment, the current indicated by milliammeter 5 will correspond merely to the resistance of motor 19 in parallel with resistance 27 only. Thus, the maximum and minimum values will be more readily distinguishable. When brush 20 reaches the center, cam 39 will have rotated through 270° and pins 53 will slip past the end of the cam, so that brush 20 will be quickly urged back to the starting position by spring 52. Since brush 20 will normally be pulled back to rest 21 faster than cam 39 will return to its zero position, there will be a readily distinguishable wiggly current line on the chart produced by recording milliammeter 5, which will contrast with the distinct, relatively long alternations between maximum and minimum current valves indicative of conducting and nonconducting segments, which will simplify interpretation of the chart. For a similar reason, the contour of cam 39 is conveniently such that there will be a slight dwell of brush 20 before its return by spring 52, so that the start of the return stroke of the brush will be more easily distinguishable. The types of patterns produced by movement of the brush across the code disc are indicated in FIGURE 10, in which a chart 71 is provided with figures at the left side indicating time, location or the like, and with patterns 72, 73, and 74 indicative of the pattern produced as the brush moves across the code disc C at the respective positions of dotted lines 72', 73' and 74' of FIGURE 5. As will be evident, the difference between swings to the left or "ones" and swings to the right or "zeros" is readily distinguishable, as well as when there are several "zeros" in succession.

In the alternative embodiment of this invention shown in FIGURES 6–8, digital pressure gage G' includes an upper tubular housing 75, having threads 76 at the upper end for attachment to a pipe string, pump casing or other lowering means for suspending the gage in a well. A blunt nose 77 is attached in spaced relation to the lower end of the housing by a threaded coupling 78 and is provided with a plurality of circumferentially spaced orifices, such as lateral orifices 79 and lower, angularly extending orifices 80, which permit the fluid in the well to enter the nose and exert a pressure on a diaphragm 81. Diaphragm 81, as in FIGURE 7, is mounted at the lower end of a Bourdon tube housing 82 and permits pressure in the well or the like to be transmitted to Bourdon tube 83 without sediment or other material in the well contacting the Bourdon tube to clog and retard movement of the same. Bourdon tube 83 is disposed in a central bore 84 of housing 82, which is provided with an enlarged lower end 85 and an enlarged upper end 86, the latter being provided with external threads 87 engaging corresponding internal threads at the lower end of housing 75, as shown. A sleeve 88 is surmounted by a cap 89 which clamps the sleeve in position and is attached to the upper end 86 of housing 82 by a plurality of circumferentially spaced cap bolts 90, thereby forming an upper housing for enclosing a code disc C' and various parts associated therewith in a manner described below. A motor 91 is mounted atop cap 89 by a plurality of mounting screws, such as screw 92 of FIGURE 7, the motor being cushioned by an O-ring 93 mounted in a groove in the top of the cap. The motor shaft 94 extends through a central opening in the cap to cause a brush 95 to scan code disc C', while an O-ring 96 is installed in a lateral groove in the central hole in cap 89 and surrounds shaft 94 for sealing purposes.

Code disc C' is conveniently similar to code disc C of FIGURES 2 and 5 and is mounted, as by adhesive, on a flanged bushing 97, which in turn is mounted on the tapered upper end of a shaft 98 and is held in place by a screw 99, as in FIGURE 7. Shaft 98 is journaled in a pair of spaced bearings 100, at either end of a flanged bushing 101, received in the upper end of bore 84 of Bourdon tube housing 82 and held in place by set screws, as shown. The lower end of shaft 98 is conveniently connected to helical Bourdon tube 83 by attachment to a pin 102 extending upwardly from the Bourdon tube, pin 102 being conveniently received in a bore extending upwardly from the lower end of shaft 98 and soldered or brazed therein. The lower end of the Bourdon tube is provided with a ring 103 which, after calibration, is fixed in the lower end of bore 84, as by soldering. The bore 84 is advantageously filled with a liquid, such as oil, which keeps dirt from entering the bore and prevents possible corrosion of the Bourdon tube. The oil transmits pressure changes from diaphragm 81 to the Bourdon tube, causing it to rotate shaft 98 and code disc C', as in the previous embodiment. Thus, as the fluid within the well enters orifices 79 and 80 of nose 77, shown in FIGURE 6, the well fluid will exert a pressure on diaphragm 81, which in turn will be transmitted by means of the liquid within bore 82 to Bourdon tube 83. Diaphragm 81 is conveniently clamped against the lower end 85 of housing 82 by a ring 104, held by a plurality of circumferentially spaced cap screws 105.

Brush 95 is preferably made of a resilient metal, as before, and is attached to a carriage or slide 109 by a pair of screws 110, as in FIGURE 7, the carriage being mounted above the code disc on a pair of spaced rods 111, as in FIGURE 8, for sliding movement therealong. The carriage and brush are normally urged to the right, as viewed in FIGURE 7 and FIGURE 8, by a compression spring 112, so that brush 95 normally engages an insulated rest 113, attached to the inside of sleeve 88 by screws extending therethrough, such as screw 114 of FIGURE 7. The slide 109, carrying brush 95, is moved in one direction across the code disc C' by a cam 39', similar to cam 39 of FIGURE 3, which is attached to the reduced lower end of motor shaft 94, as by a pin 115. A cam pin 120 projects upwardly from the left end of the carriage 109 and is engaged by cam 39', upon rotation of the cam by motor 91, to cause the carriage to be pushed to the left so that brush 95 moves from rest 113 and across code disc C'. When the brush reaches the center of the disc, cam pin 120 will slip past the end of cam 39', permitting the carriage and brush to be moved quickly to the right by spring 112.

The circuit for digital pressure gage G' is similar to that shown in FIGURE 1. Thus, motor 91 and code disc C' are connected to ground through cap 89 and shaft 98, respectively, being connected in the circuit in the manner indicated by wires 23 and 24, respectively, of FIGURE 1. The motor is connected to a source of power, such a battery, through conductor 4' of FIGURES 6 and 7, which is connected to a milliammeter, as in the previous embodiment. Conductor 4', as in FIGURE 6, conveniently extends through a sealing connector 121 mounted on a bushing 122, conveniently welded in position on the inside of housing 75 sufficiently above motor 91 to accommodate a U-shaped bracket 123, mounted atop the motor, thereby sealing the motor in housing 75. This space is conveniently filled with an inert gas, such as nitrogen, to eliminate the danger of explosion caused by sparks from the motor, while bushing 122 may, for this purpose, be provided with a purge tube 124. Resistors 25' and 27', corresponding to resistances 25 and 27 of FIGURE 1, are conveniently mounted on the inside of the respective legs of bracket 123, as in FIGURES 6 and 7. Rest 113 is provided with a terminal 125 to which a wire 26' is connected and from which wire 26' extends upwardly through an insulator 126 in cap 89 to one terminal 127 of resistor 25', the other terminal 128 of resistor 25' being grounded, as by a wire 129 connected to bracket 123. One terminal of resister 27' is connected to conductor 4', while wire 28' is connected to the other terminal and extends downwardly through an insulator in cap 89, similar to insulator 126 but disposed oppositely thereto, for connection to a terminal 130 at the outer end of spring 112, whose inner end is connected electrically, as by welding, to one leg 131 of slide 109. Thus, current is conducted from conductor 4' to brush 95 through resistor 27', wire 28', terminal 130, spring 112 and carriage 109, to which brush 95 is attached. Carriage 109, is insulated from rods 111 by insulating sleeves 132 in leg 131 on one side and legs 133 on the opposite side, legs 131 and 133 having holes in which insulating sleeves 132 are inserted.

It will be evident that there will be three different conditions occurring, similar to the previous embodiment. Thus, when brush 115 engages extension plate or rest 113, the indication of the milliammeter will correspond to the internal resistance of motor 91, in parallel with resistors 25' and 27'. However, when brush 95 engages a nonconducting segment, the current indicated by the milliammeter will correspond merely to the internal resistance of motor 91, while when the brush engages a conducting segment, the current indicated by the milliammeter will correspond to the internal resistance of motor 91 in parallel with resistor 27'. As before, when brush 95 reaches the center of code disc C', cam 39' will have rotated to a position in which pin 120 will slip past the end of the cam, causing brush 95 to be quickly urged back to initial position by spring 112. Since brush 95 will normally be pushed back to rest 113 faster than cam 39' will return to its zero position, there will be a readily distinguishable wiggly line, or series of quick spikes on the chart, produced by the recording milliammeter, which will contrast with the distinct, relatively long alternations between maximum and minimum current values indicative of conductive and nonconductive segments, thus simplifying interpretation of the chart.

It will be evident that an outer housing may be provided in the embodiment of FIGURES 1–4 and that resistors corresponding to resistances 25 and 27 may conveniently be mounted atop motor 19, as in the embodiment of FIGURES 6–8.

In some installations, it may be desirable to pivot the brush about an axis so that the contacting edge thereof moves in a circular arc. In such an arrangement, a code disc, such as code disc C" of FIGURE 9, may be provided which includes a plurality of arcuate radial or spirally arranged nonconducting segments 22', which correspond to nonconducting segments 22 of code disc C of FIGURE 5 but are arranged in a spiral pattern so that a brush moving along an arcuate path, indicated by the dotted line 135, will engage the conducting portions and nonconducting segments in a similar manner. The brush will be mounted with respect to the code disc, as on a shaft at the dotted position 136, so that the contacting face of the brush, during a given scan of the disc, will move along the arcuate path indicated by dotted line 135. As before, a rest stop 137, placed as indicated in dotted lines, will be positioned at the edge of the disc in alignment with the path of travel of the brush across the disc. The code patterns 72, 73, and 74, respectively of FIGURE 10 will be produced when the brush moves across the code disc C" at the position of the dotted lines 72", 73" and 74" of FIGURE 9.

As indicated above, a code member may be used in conjunction with electrical scanning means for measuring or indicating various types of environmental changes. Another such change which may be indicated is a change in liquid level, as in the case of the apparatus illustrated in FIGURES 10 and 11. As shown, a tank 140 for containing a liquid 141, such as liquid fuel for aircraft engines or other propulsion devices, is provided with a float 142 which is connected to a rod 143 which in turn extends upwardly through a seal ring 144 in the top of the tank. The upper end of rod 143 is connected to a flat code member or code plate P, the surface of which is conductive except for nonconducting segments 145. Since the movement of the code plate P, produced by float 142, is either upwardly or downwardly, as indicated by the double headed arrow 146, the nonconducting segments 145 are arranged in longitudinal rows which otherwise correspond to the pattern of the nonconducting segments of code disc C and C', for scanning by a brush 147 which is mounted for linear movement across code plate P, as by a motor and a cam and returned by a spring, such as in the manner disclosed in the previous embodiments. Thus, brush 147 is conveniently attached to the underside of a carriage 148 provided with bearing legs 149 for sliding across a pair of supporting rods 150, in turn mounted on supports 151 and 152. Carriage 148 is conveniently provided with an extending pin 153 which is engaged by the cam of the drive motor (not shown). As before, a rest stop 154 is conveniently provided at the edge of code plate P, for the purpose previously described. Code plate P may be guided during movement in any suitable manner, as by one or more slides 155, conveniently trapezoidal in cross section and each engaging a corresponding slot in a way 156. As will be evident, the code plate P will move in a vertical linear path in response to change in liquid level and may be used to give indications of liquid level. Thus, the present invention may be adapted for use in measuring large varieties of environmental changes, and this may be accomplished through numerous mechanical connections between a sensing means and a code member.

In each of the embodiments, it will be noted that the movement of the brush is approximatley perpendicular to the path of movement of the segments of the code member, but it will be readily understood that the scan may be at an angle to, or in any direction other than parallel to, the movement of the segments. Also, it will be understood that the code plate P of FIGURES 10 and 11 may be connected to float 142 through a linkage system so that the code plate will move only a fraction of the distance moved by the float 142, or the code member may be pivoted. Thus, other means may be utilized to connect the float with the code member.

Another type of environmental change or condition which may be indicated by a further embodiment of the invention is temperature, as by the apparatus illustrated in FIGURE 13. As shown, such apparatus is arranged for measurement of the temperature of oil at the bottom of, or at some intermediate point within, an oil well. The apparatus shown in FIGURE 13 is substantially the same as the apparatus shown in FIGURE 7, with the exception that a helically-wound bimetal strip has been inserted in place of Bourdon tube 83 and the structure surrounding the Bourdon tube is altered.

Referring now to FIGURE 13, an upper tubular housing 160 may be attached to a pipe string, pump casing, or other lowering means for suspending the temperature gage in an oil well, such as by threads 161 similar to threads 76 shown in FIGURE 6. A hollow blunt nose 162 is attached in spaced relation to the lower end of a housing 160 by a threaded coupling 163 and is provided with a plurality of circumferentially spaced orifices, such as lateral orifices 164 and lower, angularly extending orifices 165, which permit the fluid in the well to enter the nose into a cavity 166 defined therein. A housing 167, threadedly mounted in the lower end of tubular housing 160 and having an extended portion 168, is arranged to house apparatus identical to that enclosed by housing 86 in FIGURE 7.

Thus, a code disc C′, conveniently similar to code disc C of FIGURES 2 and 5, is mounted, as by adhesive, on a flanged bushing 169, which in turn is mounted on the tapered upper end of a shaft 170 and is held in place by a screw 171. Shaft 170 is journaled in a pair of spaced bearings 172, at either end of a flanged bushing 173, received in the upper end of a bore 174 within housing 167 and held in place by set screws, as shown. The lower end of shaft 170 is conveniently connected to a bimetal strip 175 by attachment to a pin 176 extending upwardly from the bimetal strip, pin 176 being conveniently received in a bore 177 extending upwardly from the lower end of shaft 170 and soldered or brazed therein. Bimetal strip 175 may be conveniently formed in the shape of a helix having an inner layer 175a of one metal, such as iron, fastened to an outer layer 175b of a second metal, such as copper. The lower end of bimetal strip 175 is firmly attached, as by soldering or brazing, to the lower inside surface 178 of a housing 179 which is threadedly attached to extended portion 168 of housing 167.

Thus, oil passing through orifices 164 and 165 into cavity 166 contacts housing 179, thereby transmitting heat to bimetal strip 175 through the atmosphere within housing 179 and through the contact of the lower end of bimetal strip 175 with housing 179 at lower inside surface 178. The heat transmitted to helical bimetal strip 175 causes it to effect proportionate rotational torque due to a difference in the coefficients of thermal expansion of each of the metals comprising the strip. Bimetal strip 175 accordingly translates temperature changes of the oil into rotational movement of code disc C′ to which it is connected through shaft 170. The remaining apparatus required to transmit such changes in temperature to a surface indicator is identical to that shown in FIGURE 7, illustrating a pressure gage.

From the foregoing, it will be evident that environmental measuring instrumentation constructed in accordance with this invention fulfills to a marked degree the requirements and objects hereinbefore set forth. It will be readily apparent that apparatus has been provided for measuring a wide variety of environmental conditions, such as pressure, temperature, humidity, velocity, etc. Furthermore, these changes may be measured regardless of the distance between the sensing means and the indicating or recording means, or variations in electrical resistance caused in changes in temperature or other conditions which may result in a change in the resistance of the conductor. It is readily apparent that the digital pressure gage of FIGURES 1–8 may be lowered into or installed in a well to measure bottom hole pressure, or placed at any other desired location at which pressure is to be measured, and may be connected with a milliammeter recorder at a remote point, which will give an indication of pressure changes. It is equally apparent that only one insulated conductor and a ground path between the gage and milliammeter is required. Since a code disc which has a code pattern thereon is rotated by a Bourdon tube or similar means in response to pressure change, the amount of this rotation is readily indicated by a scanning brush which moves back and forth across the code disc. The brush is conveniently moved across the disc by a cam mounted on the end of the motor shaft and returned again to initial position by a spring. Thus, a further indication is given that a scan has been completed, when the brush returns to its initial position. As the brush scans the disc, a plurality of conducting portions and nonconducting segments are encountered, so that the milliammeter records the current through the motor and one resistor is parallel and the current through the motor alone, respectively. When the brush returns to its initial position at the rest or extension plate, the completion of the scan cycle is indicated by a recording of the current used by the motor in parallel with two resistors. Thus, the recording of the milliammeter is entirely independent of the resistance of the conductor, which may change due to variations in temperature or other conditions. Thus, the record of the milliammeter indicates the relative values of the current, corresponding to different positions of the brush in engagement with conducting and nonconducting segments, which may readily be interpreted in accordance with the preselected pattern on the code disc.

Furthermore, the brush may be mounted for pivotal movement to follow an arcuate path across a code disc, such as shown in FIGURE 9 and having a plurality of nonconducting segments arranged in spiral pattern. In addition, a code member may be provided which moves along a linear path, in response to a changing condition, being provided with rows of nonconducting segments on a conductive surface. Thus, a brush may scan the code member transversely to the direction of its movement to indicate or record measurements indicative of a particular condition being measured. Such an arrangement is illustrated in the embodiment of FIGURES 10 and 11, wherein changes in liquid level in a container or tank are measured.

While several embodiments of this invention have been illustrated and described, it will be understood that other embodiments may exist and that various changes and variations may be made, without departing from the spirit and scope of this invention.

What is claimed is:

1. Apparatus for measuring a condition, comprising: condition sensing means having a movable portion that is responsive to the condition being sensed; coding means connected with said movable portion of said condition sensing means and providing a coded signal output consisting of a series of electrical pulses the frequency and amplitude of which indicates the sensed condition; and means including a single conductor for providing power from a power supply to said apparatus and transmitting said coded signal from the apparatus to a utilization means.

2. Apparatus for measuring a condition comprising: condition sensing means having a movable portion that is responsive to the condition being sensed; a code unit including a code member having a predetermined pattern and a second member cooperable with portions of said code member pattern to cause electrical pulses to be produced, said movable portion of said condition sensing means being operatively connected to one of said members of said code unit to control selection of said portions of said code member pattern cooperable with said second member; drive means for causing relative movement between said members of said code unit whereby said second member scans said selected portions of said code member pattern to thereby cause a series of electrical pulses to be produced the frequency and amplitude of which are indicative of the sensed condition; and means including a single conductor for providing power to said apparatus from a power source and for transmitting said pulses to a utilization means.

3. Apparatus for measuring a condition, comprising: condition sensing means; a coding unit including a first member having electrically conductive means and a second member having a pattern of electrically conductive and non-conductive portions, one member of said coding unit being responsive to change in said condition sensing means; scanning means to cause relative movement between said members of said coding unit so that there is successive contact by said conductive means of said first member with said conductive and non-conductive portions of said second member; and circuit means connected to said conductive means of said first member, said conductive portions of said second member, and said scanning means for generating a series of electrical pulses indicative of the measurement of said condition, said circuit means including a single conductor for transmitting power to said apparatus and said pulses from said apparatus to a utilization means.

4. Apparatus for measuring a condition at a remote position, comprising: condition sensing means having at least a movable portion responsive to the condition being sensed; a coding unit including a first member having electrically conductive means and a second member having a pattern of electrically conductive and non-conductive portions, one member of said coding units being operatively connected with said movable portion of said condition sensing means to partake of movement thereof, and said members being relatively movable with respect to one another with said conductive means of said first member and said pattern of said second member being engaged during at least a portion of said relative movement; and means operatively connected with said coding unit for causing said relative movement between said members of said coding unit and connected with said conductive means of said first member and said conductive portions of said pattern of said second member whereby an electrical signal is generated due to said relative movement that is nidicative of the measurement of said condition, said means including a single conductor for transmitting said electrical signal from said apparatus to a utilization means.

5. Apparatus for measuring a condition including condition sensing means; a code member mounted for movement in response to movement of said condition sensing means and having a pattern of electrically conductive and nonconductive portions; a conductive elements; scanning means to intermittently move said conductive element and said code member into contact, and during each contact interval to cause relative movement therebetween so that said conductive element successively sweeps conductive and nonconductive portions of said code member to determine the position of said condition sensing means; an electrical power source supplying electrical current through a single conductor to the contact of said conductive element with said code member pattern; power level indicating means connected between said power source and said contact; and circuit means connected to said conductive element, said code member, said scanning means, said power source and said power level indicating means for transmitting an electrical signal through the contact of said conductive element with said code member pattern and forming a series of variable electrical pulses by contact of said conductive element with conductive and nonconductive portions of said code member.

6. Apparatus according to claim 5 in which said electrical power source supplies electrical current through a single conductor to said scanning means and to said contact.

7. Apparatus according to claim 5 in which said power level indicating means includes a milliammeter.

8. Apparatus according to claim 5 in which the condition sensing means includes a liquid level indicator operatively connected to said member for moving same in response to changes in the level of liquid.

9. An oil well pressure indication system comprising a surface unit and a downhole unit interconnected by a single electrical conductor; said surface unit including a direct current power source, and current measuring means arranged to indicate the current drawn from said direct current power source through said electrical conductor; and said downhole unit including a tubular body, a hollow nose having a plurality of openings, a tubular coupling connecting said nose to said body, pressure measuring apparatus sealingly inserted within said body and having a hollow housing extending into said hollow nose, a Bourdon tube disposed within said hollow housing having one end fixedly connected to said housing and the other end arranged to rotate in response to changes in the pressure of oil within said nose, a code member having a pattern of electrically conductive and nonconductive portions connected to said rotable end of said Bourdon tube so that said code member is responsive to the movement of said Bourdon tube, a conductive element, scanning means to intermittently move said conductive element and said code member into contact, and during each contact interval to cause relative movement therebetween so that said conductive element successively sweeps conductive and nonconductive portions of said code member to determine the position of said Bourdon tube, and circuit means connected to said conductive element, said code member, and said scanning means for transmitting current from said power source through said single conductor to the contact of said conductive element with said code member pattern, thereby forming a series of variable electrical pulses by contact of said conductive element with conductive and nonconductive portions of said code member, which pulses are detected by said current measuring means to indicate a change in pressure.

10. An oil well temperature indication system comprising a surface unit and a downhole unit interconnected by a single electrical conductor, said surface unit including a direct current power source and current measuring means arranged to indicate the current drawn from said direct current power source through said electrical conductor, and said downhole unit including a tubular body, a hollow nose having a plurality of openings, a tubular coupling connecting said nose to said body, temperature measuring apparatus sealingly inserted within said body and having a closed hollow housing extending into said hollow nose, a helical bimetallic strip disposed within said hollow housing having one end fixedly connected to said housing and the other end arranged to rotate in response to changes in the temperature of oil within said nose, a code member having a pattern of electrically conductive and nonconductive portions connected to said rotatable end of said bimetallic strip so that said code member is responsive to the movement of said bimetallic strip, a conductive element, scanning means to intermittently move said conductive element and said code member into contact, and during each contact interval to cause relative movement therebetween so that said conductive element successively sweeps conductive and nonconductive portions of said code member to determine the position of said bimetallic strip and circuit means connected to said conductive element, said code member, and said scanning means for transmitting current from said power source through said single conductor to the contact of said conductive element with said code member pattern, thereby forming a series of variable electrical pulses by contact of said conductive element with conductive and nonconductive portions of said code member, which pulses are detected by said current measuring means to indicate a change in temperature.

11. Apparatus for measuring a condition including condition sensing means; a code member mounted for movement in response to movement of said condition sensing means and having a pattern of electrically conductive and nonconductive portions; a first conductive element; a second conductive element having a resistance different from that of said first conductive element; scanning means to intermittently move said first conductive element from said second conductive element into contact with said code member, and during each contact interval to cause relative movement therebetween so that said first conductive element successively sweeps conductive and nonconductive portions of said code member to determine the position of said condition sensing means; and circuit means connected to said first conductive element, said second conductive element, said code member and said scanning means for transmitting an electrical signal through the contact of said first conductive element with said code member pattern and forming a series of variable electrical pulses by contact of said first conductive element with conductive and nonconductive portions of said code member.

12. Apparatus for measuring a condition including condition sensing means; a code member mounted for movement in response to movement of said condition sensing means and having a pattern of electrically conductive and nonconductive portions; a first conductive element; a second conductive element having a resistance different from that of said first conductive element; scanning means to intermittently move said first conductive element from said second conductive element into contact with said code member, and during each contact interval to cause relative movement therebetween so that said first conductive element successively sweeps conductive and nonconductive portions of said code member to determine the position of said condition sensing means; and circuit means including resistance means, connected to said first conductive element, said second conductive element, said code member and said scanning means for transmitting an electrical signal through the contact of said first conductive element with said code member pattern and forming a series of variable electrical pulses by contact of said first conductive element with conductive and nonconductive portions of said code member.

13. Apparatus according to claim 12 in which said resistance means includes a motor for said scanning means.

14. Apparatus for measuring a condition including condition sensing means; a code member mounted for movement in response to movement of said condition sensing means and having a pattern of electrically conductive and nonconductive portions; a first conductive element; a second conductive element having a resistance different from that of said first conductive element positioned adjacent said code member; scanning means to move said first conductive element from said second conductive element into contact with said code member while said code member is disposed from an initial position by said condition sensing means, and during each contact interval to cause relative movement therebetween so that said first conductive element successively sweeps conductive and nonconductive portions of said code member to determine the position of said condition sensing means; and circuit means connected to said first conductive element, said second conductive element, said code member and said scanning means for transmitting an electrical signal to ground through the contact of said first conductive element with said code member pattern, said circuit means including first resistance means for producing a series of variable electrical pulses by contact of said first conductive element with conductive and nonconductive portions of said code member and second resistance means for producing a further variation in said pulses when said first conductive element engages said second conductive element.

15. Apparatus for measuring a condition including condition sensing means; a code member mounted for movement in response to movement of said condition sensing means and having a pattern of electrically conductive and nonconductive portions; a first conductive element; a second conductive element having a resistance different from that of said first conductive element positioned adjacent said code member; scanning means to move said first conductive element from said second conductive element into contact with said code member while said code member is disposed from an initial position by said condition sensing means, and during each contact interval to cause relative movement therebetween so that said first conductive element successively sweeps conductive and nonconductive portions of said code member to determine the position of said condition sensing means; an electrical power source; and circuit means connected to said first conductive element, said second conductive element, said code member, said scanning means and said power source for transmitting an electrical signal to ground through the contact of said conductive element with said code member pattern, said circuit means including power level indicating means connected between said power source and the contact of said first conductive element with said code member pattern, first resistance means for producing a series of variable current pulses by contact of said first conductive element with conductive and nonconductive portions of said code member, and recond resistance means for producing a further variation in said pulses when said first conductive element engages said second conductive element.

16. Apparatus for measuring a condition, comprising: condition sensing means; cam means; and coding means having at least two cooperating members one of which is responsive to said condition sensing means, and one of which is operatively connected with said cam means, operation of said cam means causing said cooperating members of said coding means to produce a coded electrical signal output indicative of the measurement of said condition and means for transmitting said electrical signal output to a utilization means.

17. Apparatus for measuring a condition, comprising: condition sensing means having a movable portion that is responsive to the condition being sensed; cam means; and coding means including a first member having electrically conductive means and a second member having a pattern of electrically conductive and nonconductive portions, one member of said coding means being responsive to movement of said movable portion of said condition sensing means, and one member of said coding means being operatively connected with said cam means so that operation of said cam means causes relative movement between said conductive means of said first member and said pattern of said second member to produce a series of pulses indicative of the measurement of said condition; and means for transmitting said series of pulses to utilization means.

18. Apparatus for measuring a condition, comprising: condition sensing means having a movable portion that is responsive to the condition being sensed; gating means connected with said movable portion of said condition sensing means; a coding circuit having at least one electrical signal path having resistance means therein, said signal path also including said gating means; control means for controlling operation of said gating means in conjunction with said condition sensing means whereby an electrical signal is produced that is indicative of the measurement of said condition; and means connected to said coding circuit for transmitting said electrical signal from said apparatus to a utilization means.

19. Apparatus for measuring a condition, comprising: condition sensing means having a movable portion that is responsive to the condition being sensed; gating means connected with said movable portion of said condition sensing means; a coding circuit including a plurality of electrical signal paths each of which has resistance means therein with at least one of said paths having said gating means therein; control means for controlling operation of said gating means in conjunction with said condition sensing means whereby an electrical signal is produced that is indicative of the measurement of said condition; and means connected to said coding circuit for transmitting said electrical signal from said apparatus to a utilization means.

20. Apparatus for measuring a condition, comprising: condition sensing means; gating means having at least two cooperating members with one said member being responsive to movement of said condition sensing means; a coding circuit including an electrical signal path having resistance means therein, said path also having said cooperating members of said gating means therein; control means for controlling operation of one member of said gating means relative to said other member of said gating means so that said control means and said condition sensing means cause said gating means to open and close in a predetermined manner whereby said coding circuit produces a series of pulses indicative of the measurement of said condition; and means connected to said coding circuit for transmitting said pulses from said apparatus to a utilization means.

21. Apparatus for measuring pressure comprising condition sensing means including a Bourdon tube; a code member having a pattern of electrically conductive and nonconductive portions; said Bourdon tube having one end fixedly connected to a stationary portion of said apparatus and the other end connected to said code member so that said code member is responsive to the movement of said Bourdon tube; a conductive element; scanning means to intermittently move said conductive element and said code member into contact, and during each contact interval to cause relative movement therebetween so that said conductive element successively sweeps conductive and nonconductive portions of said code member to determine the position of said condition sensing means; and circuit means connected to said conductive element, said code member and said scanning means for transmitting an electrical signal through the contact of said conductive element with said code member pattern and forming a series of variable electrical pulses by contact of said conductive element with conductive and nonconductive portions of said code member.

22. Apparatus according to claim 21 in which the apparatus includes a tubular body, a nose, a coupling connecting said nose to said body, a diaphragm extending across the lower end of said tubular body and being responsive to changes in pressure, said tube containing fluid for transmitting pressure changes from said diaphragm to said Bourdon tube.

23. Apparatus for measuring temperature comprising condition sensing means including a bimetallic strip; a code member having a pattern of electrically conductive and nonconductive portions; said bimetallic strip having one end fixedly connected to a stationary portion of said apparatus and the other end connected to said code member so that said code member is responsive to the movement of said bimetallic strip; a conductive element; scanning means to intermittently move said conductive element and said code member into contact, and during each contact interval to cause relative movement therebetween so that said conductive element successively sweeps conductive and nonconductive portion of said code member to determine the position of said condition sensing means; and circuit means connected to said conductive element, said code member and said scanning means for transmitting an electrical signal through the contact of said conductive element with said code member pattern and forming a series of variable electrical pulses by contact of said conductive element with conductive and nonconductive portions of said code member.

24. An oil well temperature gage comprising a tubular body, a hollow nose having a plurality of openings, a tubular coupling connecting said nose to said body, temperature measuring apparatus sealingly inserted within said body and having a hollow housing extending into said hollow nose, a helical bimetallic strip disposed within said hollow housing having one end fixedly connected to said housing and the other end arranged to rotate in response to changes in the temperature of oil within said nose, a code member having a pattern of electrically conductive and nonconductive portions connected to said rotatable end of said bimetallic strip so that said code member is responsive to the movement of said bimetallic strip, a conductive element, scanning means to intermittently move said conductive element and said code member into contact, and during each contact interval to cause relative movement therebetween so that said conductive element successively sweeps conductive and nonconductive portions of said code member to determine the position of said bimetallic strip, and circuit means connected to said conductive element, said code member, and said scanning means for transmitting an electrical signal through the contact of said conductive element with said code member pattern and forming a series of variable electrical pulses indicative of a change in temperature by contact of said conductive element with conductive and nonconductive portions of said code member.

25. An oil well pressure gage comprising a tubular body, a hollow nose having a plurality of openings, a tubular coupling connecting said nose to said body, pressure measuring apparatus sealingly inserted within said body and having a hollow housing extending into said hollow nose, a Bourdon tube disposed within said hollow housing having one end fixedly connected to said housing and the other end arranged to rotate in response to changes in the pressure of oil within said nose, a code member having a pattern of electrically conductive and nonconductive portions connected to said rotatable end of said Bourdon tube so that said code member is responsive to the movement of said Bourdon tube, a conductive element, scanning means to intermittently move said conductive element and said code member into contact, and during each contact interval to cause relative movement therebetween so that said conductive element successively sweeps conductive and nonconductive portions of said code member to determine the position of said Bourdon tube, and circuit means connected to said conductive element, said code member, and said scanning means for transmitting an electrical signal through the contact of said conductive element with said code member pattern and forming a series of variable electrical pulses indicative of a change in pressure by contact of said conductive element with conductive and nonconductive portions of said code member.

References Cited by the Examiner
UNITED STATES PATENTS

| | | | |
|---|---|---|---|
| 1,976,266 | 10/1934 | Nagel | 73—313 |
| 2,425,868 | 8/1947 | Dillon | 73—152 |
| 2,588,102 | 3/1952 | Forero. | |
| 2,590,982 | 4/1952 | Long | 73—152 |
| 2,909,062 | 10/1959 | Curtis et al. | 73—398 |
| 3,007,134 | 10/1961 | Kolb. | |
| 3,056,298 | 10/1962 | Scholtz | 73—398 |
| 3,078,717 | 2/1963 | Howard | 73—363.5 |
| 3,154,946 | 11/1964 | Ordorica et al. | 73—313 |
| 3,160,010 | 12/1964 | Levinn et al. | 73—363.5 |

LOUIS R. PRINCE, *Primary Examiner.*

RICHARD C. QUEISSER, *Examiner.*

D. O. WOODIEL, *Assistant Examiner.*